United States Patent [19]

Hock

[11] 4,252,491
[45] Feb. 24, 1981

[54] MATERIAL LIFT PLATFORM

[75] Inventor: John R. Hock, Valley Stream, N.Y.

[73] Assignee: Jelco Service Co., Inc., Valley Stream, N.Y.

[21] Appl. No.: 25,729

[22] Filed: Mar. 30, 1979

[51] Int. Cl.³ ............................................. B60P 1/46
[52] U.S. Cl. ..................................... 414/540; 414/542; 414/921; 187/9 R
[58] Field of Search ............................. 414/540–545, 414/921, 140, 462, 84; 244/137 R; 187/9 R, 11, 20; 212/56, 230, 231, 264

[56] References Cited

U.S. PATENT DOCUMENTS

| | | | |
|---|---|---|---|
| 3,088,608 | 5/1963 | Theodore | 244/137 R X |
| 3,275,170 | 9/1966 | MacRae et al. | 414/545 |
| 3,282,449 | 11/1966 | Buford | 414/540 |
| 3,463,334 | 8/1969 | Blakely et al. | 244/137 R |
| 3,552,587 | 1/1971 | Warren | 244/137 R |
| 3,957,164 | 5/1976 | Brown | 414/542 |
| 4,026,387 | 5/1977 | Abreu | 414/921 X |
| 4,083,429 | 4/1978 | Abbott | 187/9 R |

Primary Examiner—Stephen G. Kunin
Assistant Examiner—Terrance L. Siemens
Attorney, Agent, or Firm—Brooks, Haidt, Haffner & Delahunty

[57] ABSTRACT

A hoist for loading and unloading cargo through a side or rear doorway of a van or truck slides from a stored position completely inside the vehicle to an operating position with a lift platform outside the vehicle that can be lowered and raised by an electric winch connected to the platform by cables. The hoist has a pair of generally horizontal telescoping parallel beams guiding a sliding yoke movable by means of the winch to raise and lower the platform through cable runs secured to arms extending from posts at both sides of the platform. Pivoting side support beams cooperating with stop members upon extension to operating position, and other safety features prevent improper operation. If very heavy loads are to be lifted on to a small vehicle, it may be desirable to brace the vehicle, as by means of a jack at or near the location of the lift platform to avoid tilting the vehicle. The material lift platform of the invention makes it possible to use a small truck or van to carry cargo that would otherwise require the use of a large truck, thus resulting in great fuel economy.

15 Claims, 8 Drawing Figures

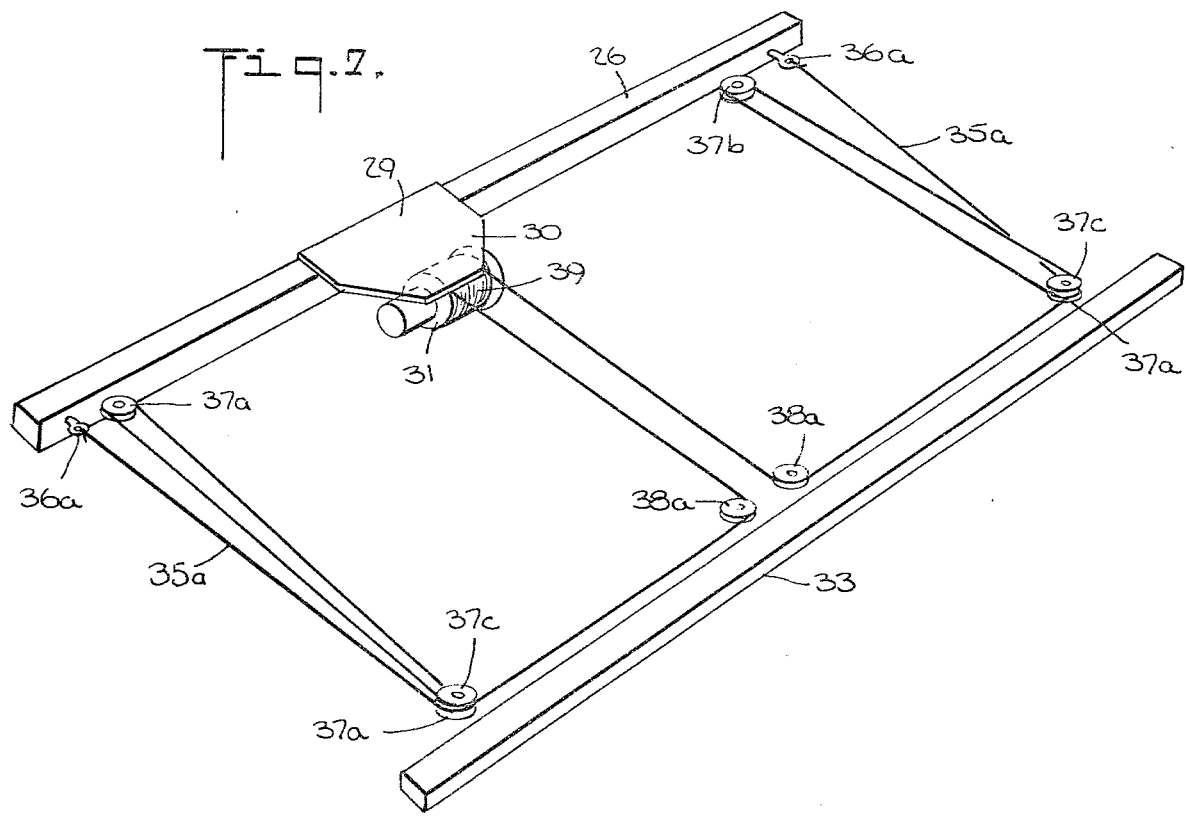
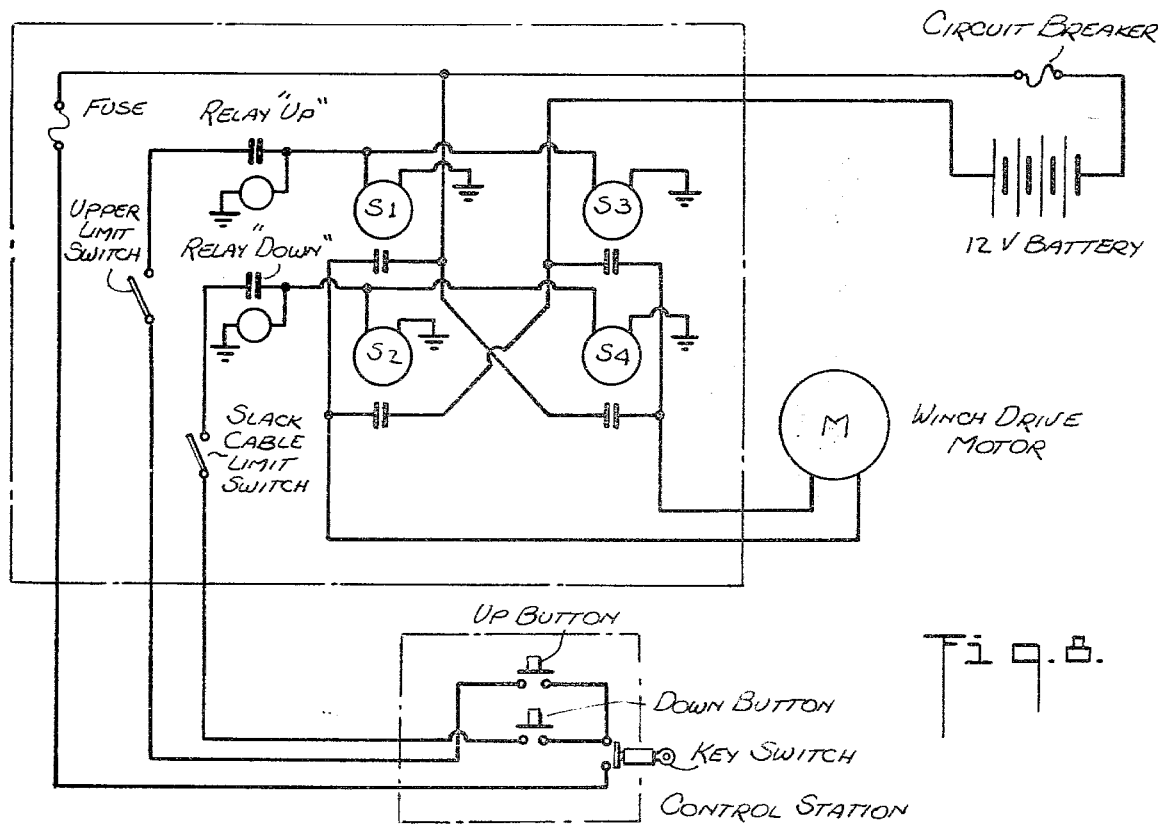

MATERIAL LIFT PLATFORM

BACKGROUND OF THE INVENTION

1. Field of the Invention

The invention relates to apparatus for loading and unloading vehicles, and more particularly to a mechanical/electrical material lift platform for vans and trucks.

2. Description of the Prior Art

Hydraulic power lift gates for trucks are in common use, but such hydraulic lift gates or elevators have serious limitations. Such conventional devices are relatively expensive and are accordingly usually only installed in trucks used exclusively or primarily for transporting the heavy items for which powered loading and unloading is necessary, not in vehicles used for general purposes. Hydraulic mechanisms are usually complicated and difficult to repair, requiring specialized technical skills and considerable down-time. Lift gates ordinarily have a platform that always extends outside the truck body, and can thus be easily damaged when backing trucks into loading docks.

Small vans are often lower than existing loading docks, so that goods must be lowered, rather than lifted during loading, and conventional lift gates cannot serve this function. These and other drawbacks have limited the use of hydraulic lift gates, and the need remains for a simple, effective yet inexpensive loading device which is economically available even to the operators of small trucks and vans.

SUMMARY OF THE INVENTION

The mechanical-electrical lift platform of the present invention overcomes the drawbacks of prior art hydraulic lift gates by being completely retractible into a vehicle when not in use, while not occupying much of the useful cargo space therein. The lift platform of the invention is easy to install in all models trucks and vans in common use, either at a rear or side doorway.

Various modifications adapt the lift platform of the invention for heavier loads, or with loading docks higher than the vehicle floor.

A pair of parallel beams are pivotally secured to vehicle frame structure to extend from such structure toward a door opening, and each beam has a telescoping extension slidable from a position within the vehicle to an operating position projecting through the door opening. Rear ends of the telescoping extensions are interconnected by a cross beam having a winch mounted at its center, equally spaced from the extensions and connected by a pair of cables to a sliding yoke, mounted for movement along the beam extensions. The sliding yoke is connected by further cables and over sheaves for raising and lowering a platform.

Near their forward ends the beam extensions are supported and braced by generally upright beams pivotally mounted by means secured to vehicle floor structure, and a fixed stop member limits the movement of these pivotable support beams to a position at which the telescoping beams are in their fully extended operating condition. The platform has a flat central portion equipped with outer and inner folding platform plates for moving cargo on to the central portion from outside the vehicle and from the central platform area to the vehicle floor respectively.

The cables through which the platform is actuated are symmetrically disposed with respect to each other for coordinated operation by means of the centrally located winch, which preferably has a small electrical motor controlled by means of push buttons or the like conveniently located near the vehicle doorway as at the forward end of one of the beam extension members. Safety features include a slack cable switch for stopping the winch operation when the platform meets an obstruction, and momentary contact on buttons which only cause the platform to move while they are held down.

These and other objects and advantages of the material lift platform of the invention will be more fully understood from the following detailed description of preferred embodiments of the invention, especially when that description is read with reference to the accompanying drawing figures.

BRIEF DESCRIPTION OF THE DRAWINGS

In the accompanying drawings, in which like reference numerals indicate like parts throughout:

FIG. 7 is a somewhat schematic view of a winch and cable arrangement.

FIG. 8 is a diagram of electrical circuitry preferably employed in the device of the invention.

DETAILED DESCRIPTION OF PREFERRED EMBODIMENTS

Figure 1:
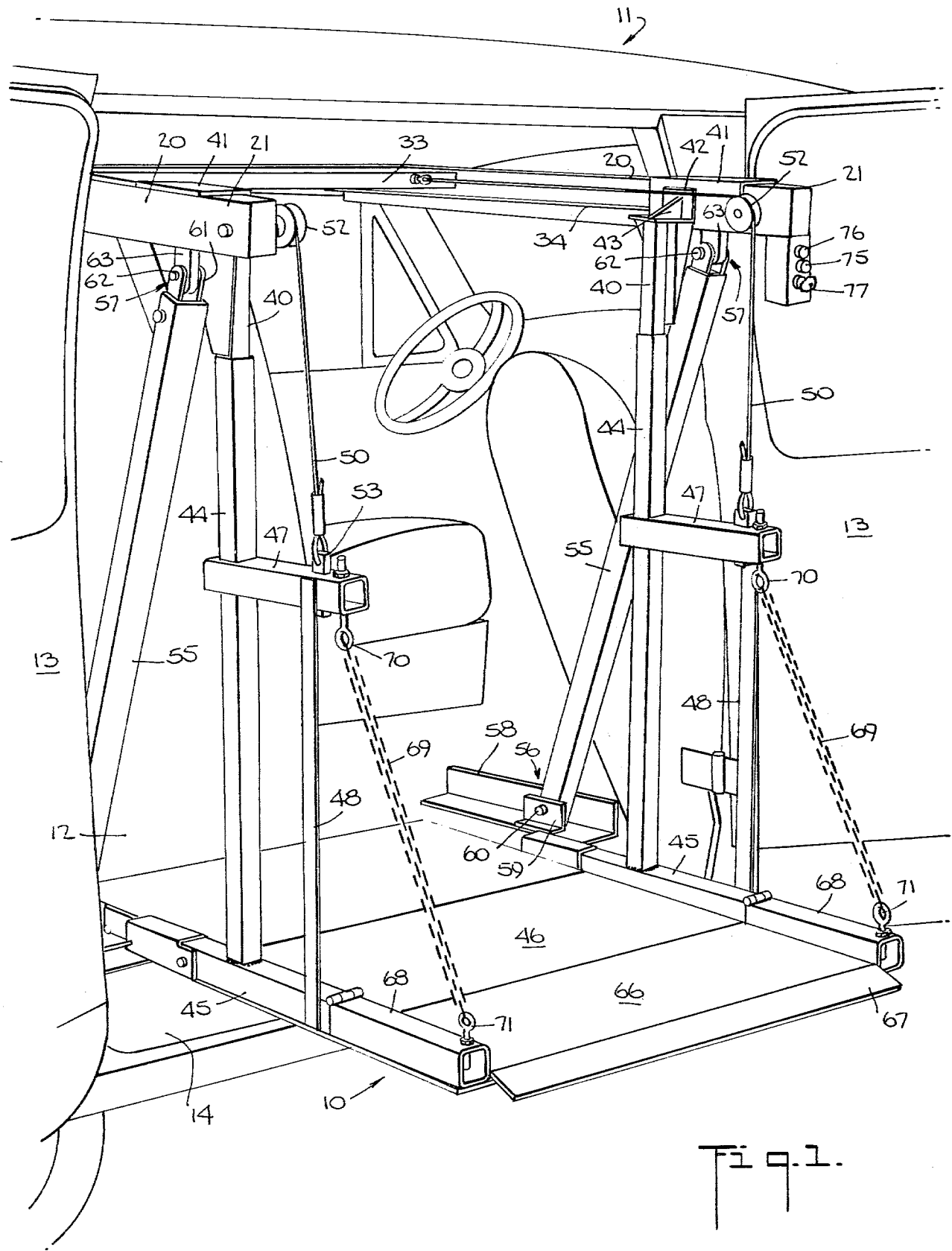
FIG. 1 is a view in perspective of a lift platform according to the invention extended to operating condition from within a van.

In the drawings, the material lift platform of the invention, generally designated by the reference numeral 10 is shown mounted in a conventional small van 11 having a side doorway 12, but it should be understood that the device 10 can be readily used in other types of vehicles such as large trucks, and can be mounted to extend through the rear doorway of a van or other vehicle, since the few points of attachment of the device 10 can be bolted or otherwise secured to existing frame structures of a wide variety of vehicles without modification of the vehicle itself. The illustrated application is merely illustrative of one kind of installation in which the material lift platform of the invention provides advantages over conventional hydraulic lift gates and hoists.

FIGS. 1-5 show the lift platform device 10 installed in a van 11 to project outward through a side doorway 12 shown provided with outward swinging doors 13. The van 11 is shown to have floor 14 and roof structure 15 and a side wall 16 opposite the side doorway 13.

Figure 2:
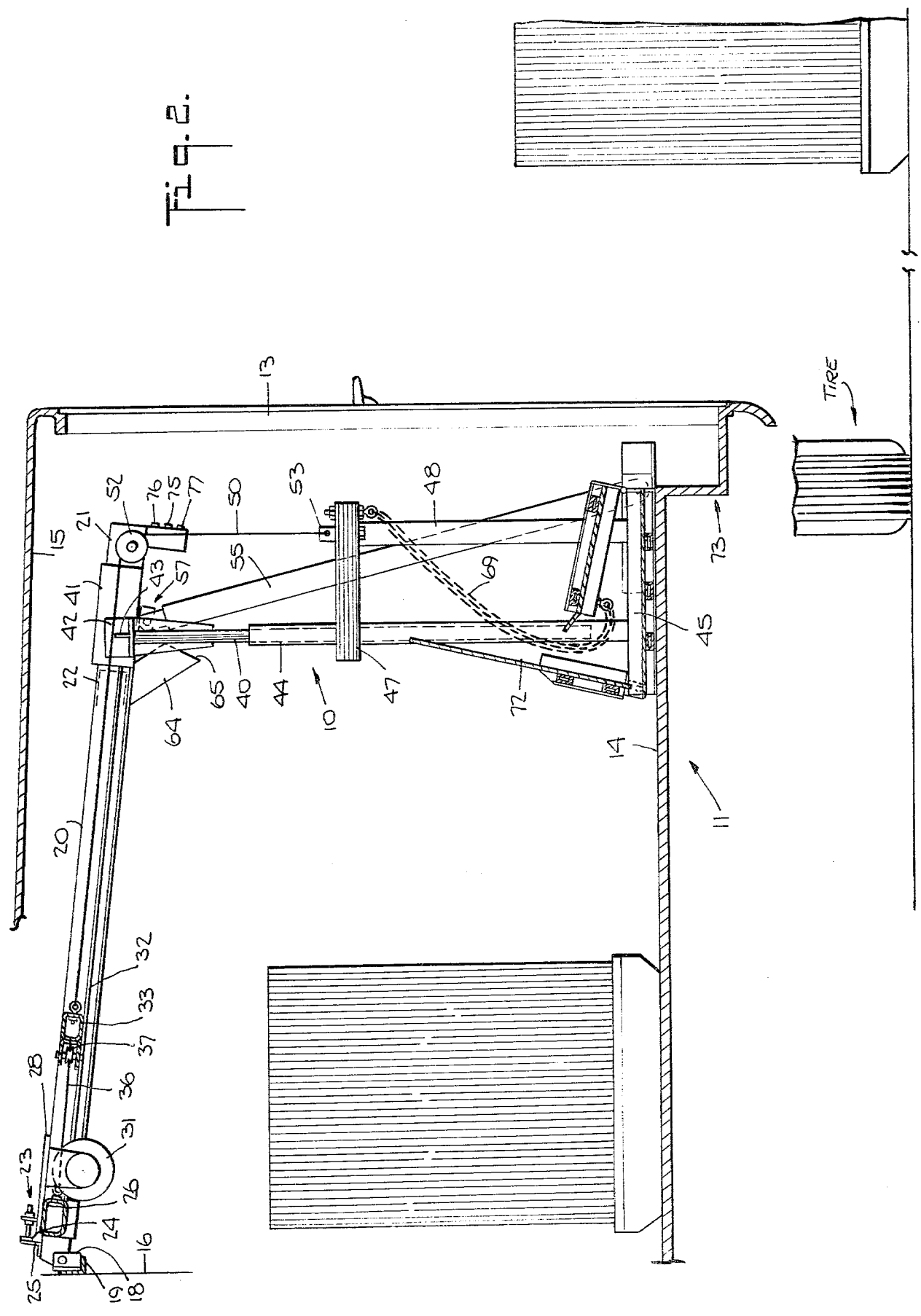
FIG. 2 is a view in section of the lift platform in storage condition in a van.
Figure 3:
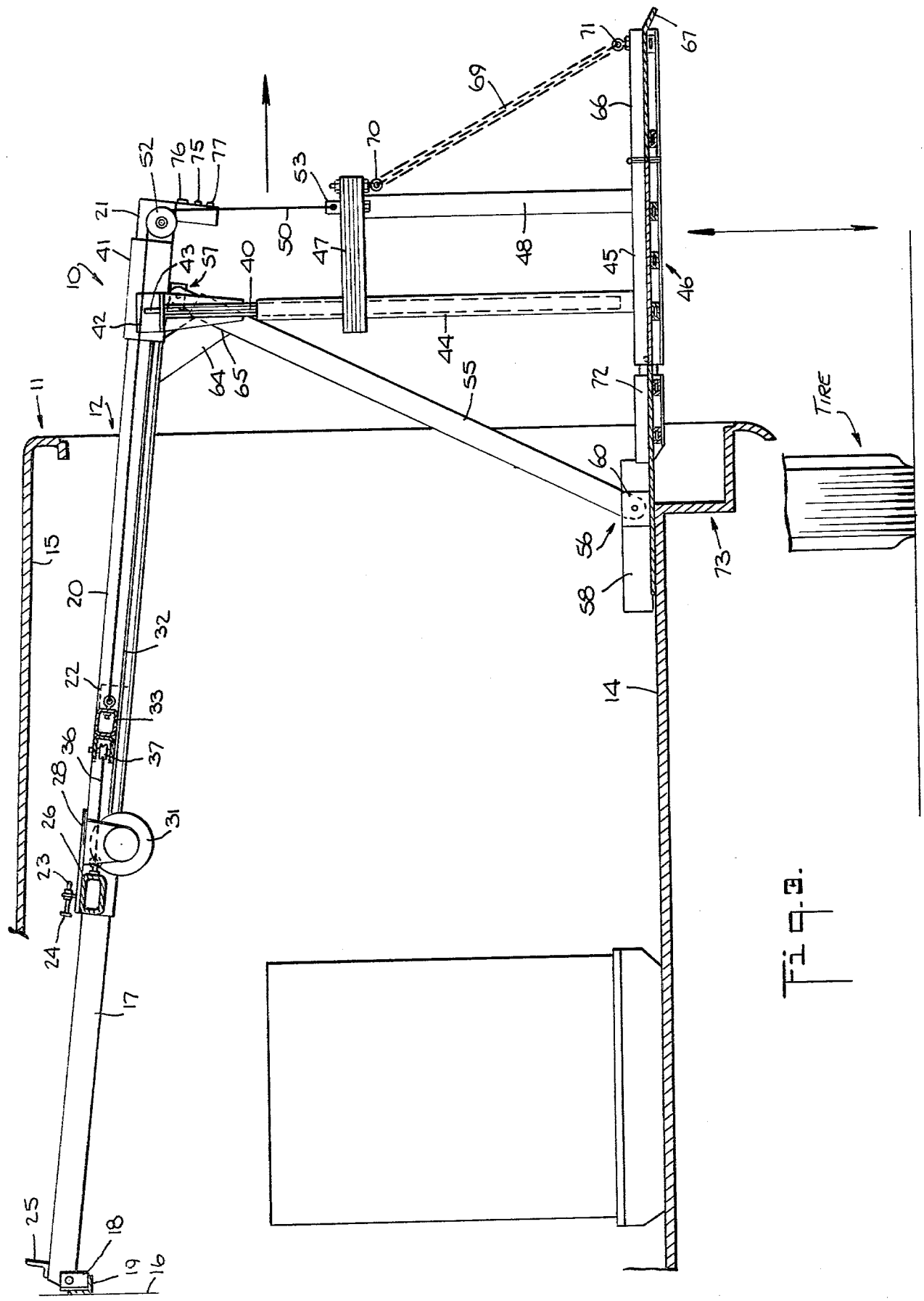
FIG. 3 is a view similar to that of FIG. 2 but showing the extended condition of the platform.
Figure 4:
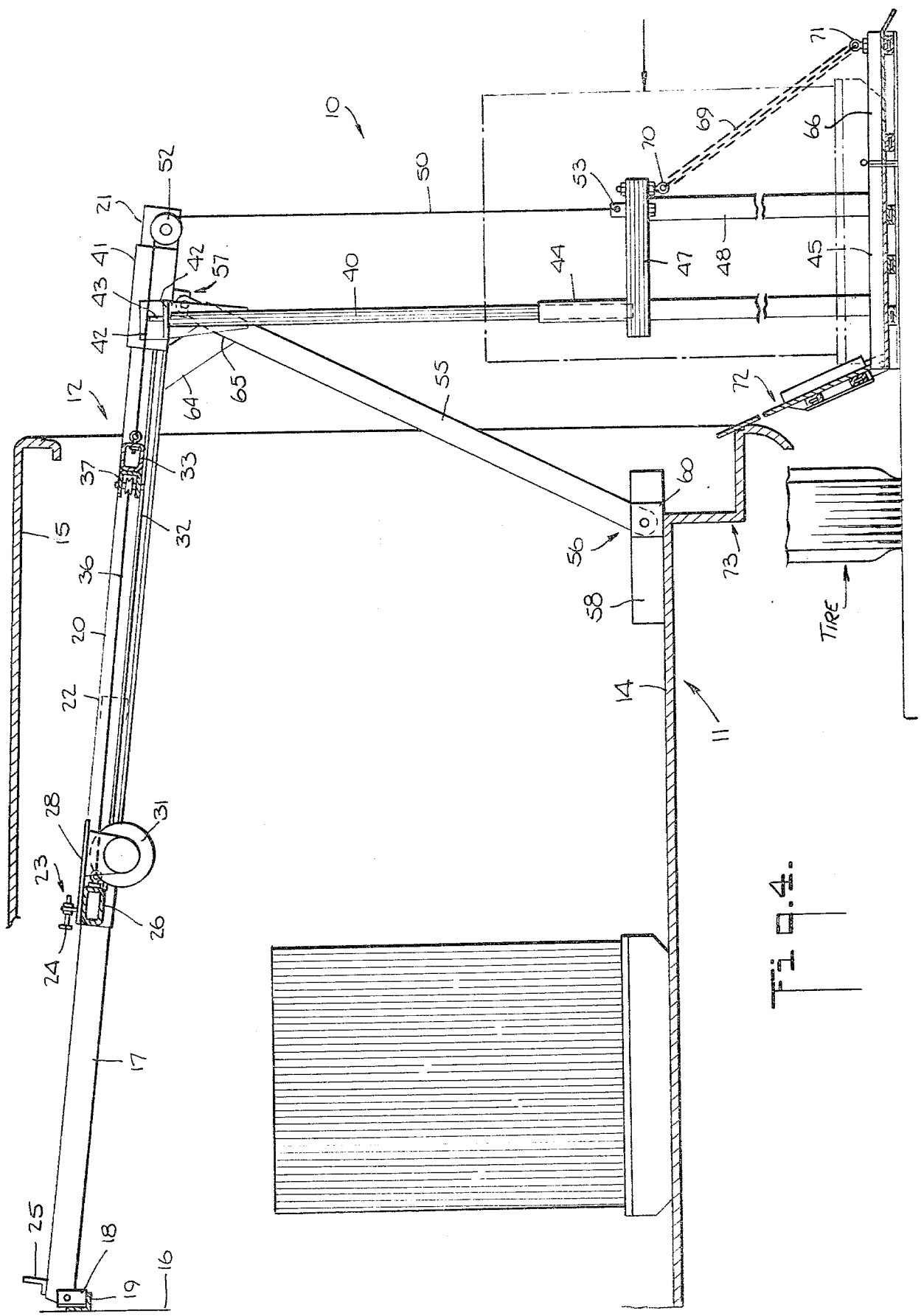
FIG. 4 is a view similar to that of FIG. 3 with the platform lowered to ground level.
Figure 5:
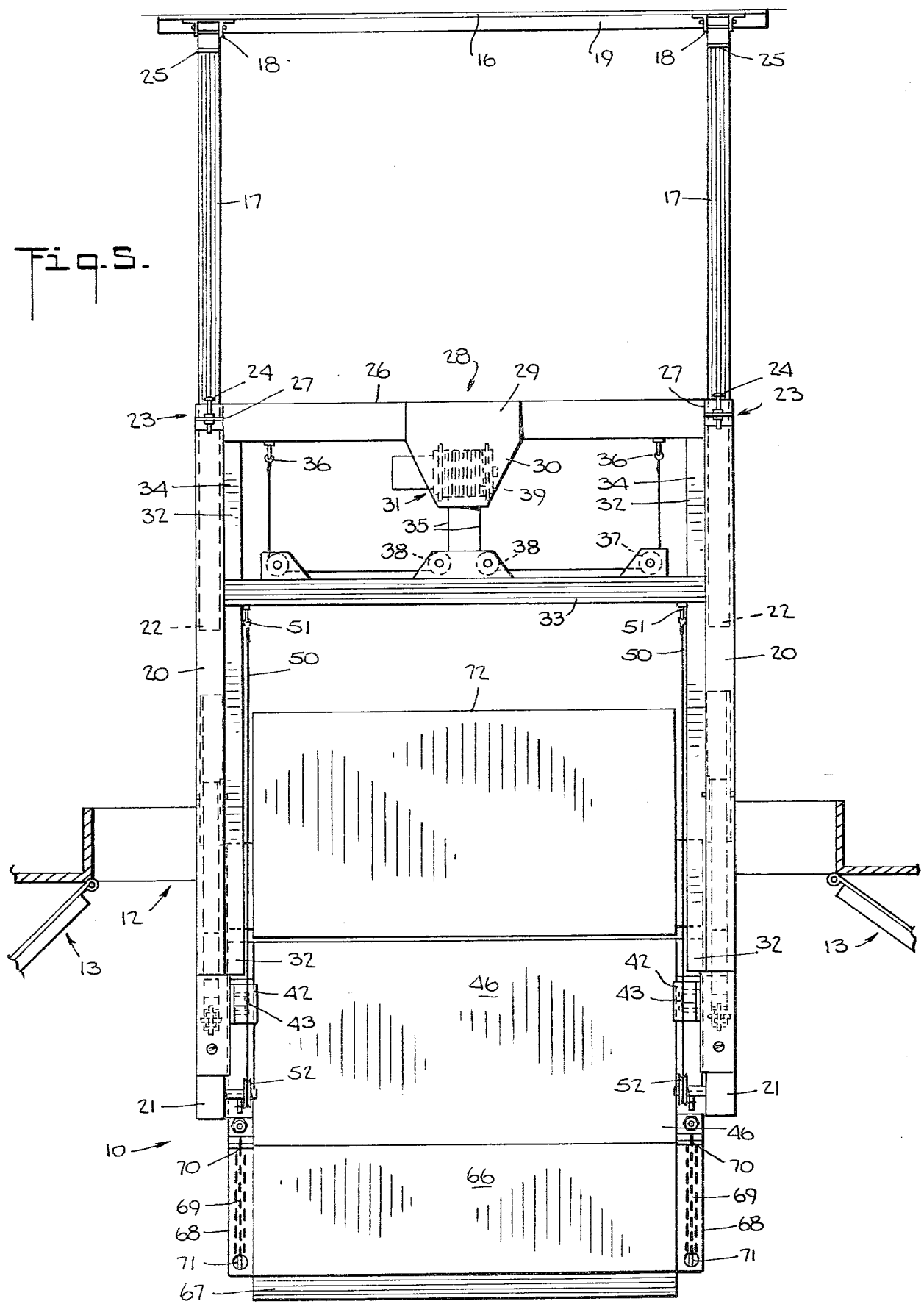
FIG. 5 is a top view of the lift platform in extended condition.

A pair of laterally spaced parallel beams 17, shorter in length than the width of the van 11 in which the device 10 is installed, as best seen in FIGS. 3-5, are pivotally mounted at the upper part of the side wall 16 by means of fittings 18 which can be directly secured to a frame member of the van wall 16 or to a mounting member such as the angle 19 shown in FIGS. 2-5 secured to the wall 16. The pivotable beams 17 can be made of rectangular steel tubing. A beam extension member 20, which can be of rectangular steel tubing slightly larger than the beam 17 is slidably fitted over each of the beams 17 to extend forward in a telescoping manner. Suitable bearings, not illustrated, can be provided for smoother motion, if desired. This telescoping motion can be seen by comparing the extended condition of FIGS. 3-5 with the retracted condition shown in FIG. 2, where it will be noted that even when retracted, the extensions 20 have their forward ends 21 extending beyond the beams 17 as shown by the dotted lines marking the end of beam 17 at 22 in FIGS. 2-5. At its rear end each extension member 20 has an adjustable stop for limiting retraction, which can comprise an adjustable screw fitting 23 having a head 24 which abuts a fixed angle piece 25 secured atop each beam 17 when the telescoping extensions 20 are in the fully retracted condition shown in FIG. 2.

A cross beam 26, which can be formed of sturdy rectangular steel tubing is fixedly secured at is ends 27 as by welding to the rear end portions of both beam extension members 20 as shown in FIGS. 2-5, and a winch support plate 28 is secured at the midpoint of the cross beam 26, as best seen in FIGS. 5 and 7, wherein the winch support plate is shown to have a generally rectangular body portion 29 overlying and secured, as by welding, to the cross beam 26 and a forwardly projecting trapezoidal portion 30 under which the electrical winch 31 is mounted.

Right angle guide rail members 32 are mounted at the inner sides of the beam extension members 20 as shown in FIGS. 2-4 and in top view of FIG. 5 to support and carry a sliding yoke 33 which can also be of rectangular tube stock, the ends of the sliding yoke 33 resting on the ledges provided by the inwardly extending leg 34 of each guide members 32 as seen best in FIGS. 1 and 5. The sliding yoke 33 can travel from a position near the winch 31 as shown in FIGS. 2 and 3 to an advanced position away from the winch 31 as illustrated in FIG. 4.

The sliding yoke 33 is connected to the winch for movement in response to the paying out or winding in of a pair of symmetrically arranged cables 35 as shown in FIG. 5, where each cable 35 is shown to run forward from an end attached to a hook or other fastener 36 on the cross beam 26 over a pulley 37 mounted on the rear side of the sliding yoke 33, then inwardly toward the middle of the yoke and over another pulley 38 and then to the drum 39 of the winch 31. The pulleys 38 are spaced to lead the cable 35 from opposite ends of the drum 39 as shown in FIG. 5 without interference between the two cables 35. In the presently preferred embodiment of the device illustrated, the winch 31 is preferably a 12 volt D.C. electric winch which can operate on the vehicle's battery, and which runs at a speed capable of pulling the yoke 33 under a load of 1500 pounds at a speed of 10 feet per minute. The same winch can be employed with the cable arrangement shown in FIG. 7 to pull the yoke 33 under a load of 3,000 pounds at a speed of 5 feet per minute.

In the arrangement of FIG. 7, each cable 35a runs forward from a point of attachment to a fastener 36a on the cross beam 26 to a lower pulley 37a of a pair of vertically superposed pulleys 37a, 37c, then back to a pulley 37b on the cross beam 26, then back to upper pulley 37c of the pair of pulleys on the sliding yoke 33, then across the sliding yoke and over a pulley 38a to the drum 39 of the centrally located winch 31, providing twice the mechanical advantage of the arrangement shown in FIG. 5.

The cables 35 and 35a can be 3/16 inch aircraft cable or other strong wire rope.

A downwardly extending post 40 is firmly secured near the forward end 21 of each of the beam extensions 20. The posts 40, which can be of rectangular steel tubing, do not extend exactly perpendicular to the beam extensions 20 but form an angle therewith slightly greater than 90 degrees at the inner side as shown in the drawings, so that the posts 40 are substantially vertical despite the slight downward slant of the beams 17 and extensions 20. Each post 40 is preferably secured to a sturdy angle 41 that overlies the beam extension 20 by means of another angle piece 42 which can have a reinforcing gusset 43 as best shown in FIG. 1, all of these parts being welded together.

Telescopingly slidable post extension members 44 extend downward from each post 40. As shown in the various figures of the drawings, these post extension members 44 are preferably formed of rectangular steel tubing housing an internal opening slightly larger than the posts 40 for smooth sliding fit thereon from an upward retracted position as shown in FIGS. 1-3 to a downwardly extended condition shown in FIG. 4. At its lowermost end, each post extension member 44 is secured, as by welding, to a horizontally extending rectangular tube side rail 45 affixed to a platform plate 46 as shown in FIGS. 1 and 5, for raising and lowering the platform plate 46.

A sturdy arm 47, formed of rectangular steel tubing extends perpendicularly forward from each post extension member 44 to which the arms 46 are secured by welding, and a reinforcing member, which can be a rigid steel strap 48 extends between the forward part of each arm 47 and the platform plate side rail 45, the points of attachment of the strip 48 and post extension 44 to the platform plate rails 45 being spaced to support the platform plate 46 against heavy loads.

The platform plate 46 and the parts associated therewith are raised and lowered by motion of the sliding yoke 33 by means of symmetrically arranged cables 50 running from the sliding yoke 33 to the forwardly extending arms 47 on the post extension 44.

Each cable 50 runs forward from a fastener 51 on the forward face of the sliding yoke 33 over a pulley 52 at the front end 21 of the beam extension 20 and then down to a fastener 53 on the arm 47, between the points of attachment of the arm 47 to the post extension 44 and the reinforcing strip 48, as shown in FIGS. 1-6. Thus, when the sliding yoke 33 is pulled back toward the winch 31 by winding the cables 35, the platform plate 46 and the associated parts move upward, and when the winch 31 pays out the cables 35 the platform plate 46 is lowered.

The forward ends 21 of the beam extensions 20 are supported by pivotally mounted brace beams 55 which extend from lower pivot fittings 56 secured to the vehicle floor to upper pivot fastners 57 near the forward ends of the beam extensions 20. As illustrated in the drawings each brace beam 55 can be formed of sturdy rectangular steel tubing, and the lower pivot fitting 56 can comprise two angle pieces 58 and 59 secured at the vehicle floor and having a pivot pin 60 extending therebetween through a hole in the lower end portion of the beam 55. A clevis fitting 61 can be mounted at the upper end of each brace beam 55 for pivoting movement about a pin 62 extending through an ear 63 projecting downward from the beam extension 20 as shown best in FIG. 1. When the beam extensions are moved from the retracted condition shown in FIG. 2 to the extended condition shown in FIGS. 1, 3 and 4, the brace beams 55 move from a rearward slanting position to a forward slanting position bracing the beam ends 21 against loads on the platform.

Preferably there are fixed stop members 64 extending down and forward from each beam extension to stop and lock the device in extended condition when a slanted front face 65 comes into abutting engagement with a rear side of the brace beam, as can be seen by comparing the illustration of FIG. 2 with that of FIG. 3 where the fixed stop is engaged.

Attention is now directed to the platform plate 46 which has a hinged folding outside platform plate extension 66, preferably with a slanted downward front lip 67 for easy loading, and side rails 68 like the rails 45 of the main platform plate 46. For added strength the outside platform plate 66 is shown to be secured to the arms 47 by a pair of chains 69 extending between eyes 70 and 71 attached to the arms 47 and rails 68 respectively.

Also shown is a hinged folding inside platform plate extension which folds up out of the way when the device is in retracted condition within the vehicle as shown in FIG. 2. If the vehicle has a step as shown at 73 in FIGS. 2, 3, and 4, the inside plate extension 72 serves to bridge the gap between the vehicle floor 14 and the central plate 46 when folded down as in FIG. 3 for moving cargo between the platform and the vehicle floor. As seen in FIG. 4, the inside plate 72 can also serve as a stop when an article is loaded on to the platform at ground level.

The several plate sections 46, 66 and 72 can be steel plates suitably reinforced by cross members running along their lower sides as shown.

The hoist is operated as follows. Starting from the stored condition of FIG. 2, the operator opens the vehicle doors and pulls the hoist outward manually by grasping the cables 50 with each hand. Pulling outward easily extends the telescoping beam extensions 20. The operator then lowers the outside platform plate extension 66 to the condition shown in FIG. 3 and also folds down the inside platform plate extension 72 to the FIG. 2 position.

To lower the platform to the ground, the operator pushes a "down" button 75 of the controls and holds the button in until the platform reaches the ground as shown in FIG. 4. Release of the button stops the electrical winch 31 which only operates when the "down" button 75 or the "up" button 76 is held depressed. An article or articles are then loaded on the platform as shown in FIG. 4, and the operator pushes the up button until the platform carrying the load has been pulled upward by the winch 31 to the position shown in FIGS. 1 and 3 and the cargo is moved into the vehicle interior over the inside platform extension plate 72. Cargo is unloaded by reversing the procedure just outlined.

A key switch, shown at 77 is preferably provided for safety and security. FIG. 8 illustrates a presently preferred electrical and control system for the device of the invention, although it will be understood that the arrangement shown in FIG. 8 is merely illustrative, and various other electrical systems could be employed. In FIG. 8, reference character M indicates the motor of the winch 31, which preferably operates on the 12 volts provided by a vehicle battery. Automotive starter solenoids are shown at S1, S2, S3 and S4, the solenoids S1 and S3 being arranged in series with a relay marked "up" in the drawing, which can be a 12 volt coil having normally closed contact, and the solenoids S2 and S4 are in series with a "down" relay similar to the "up" relay.

An upper limit switch is shown between the "up" button and the "up" relay and solenoids, and a slack cable switch is shown between the "down" button and "down" relay for stopping the motor when an obstruction blocks travel of the platform.

If desired the system could have a transformer to adapt it for running on main power at loading stations provided with electrical outlets, but that is not usually necessary since the lift platform would not normally be run so long or continuously as to seriously drain a vehicle battery.

Figure 6:
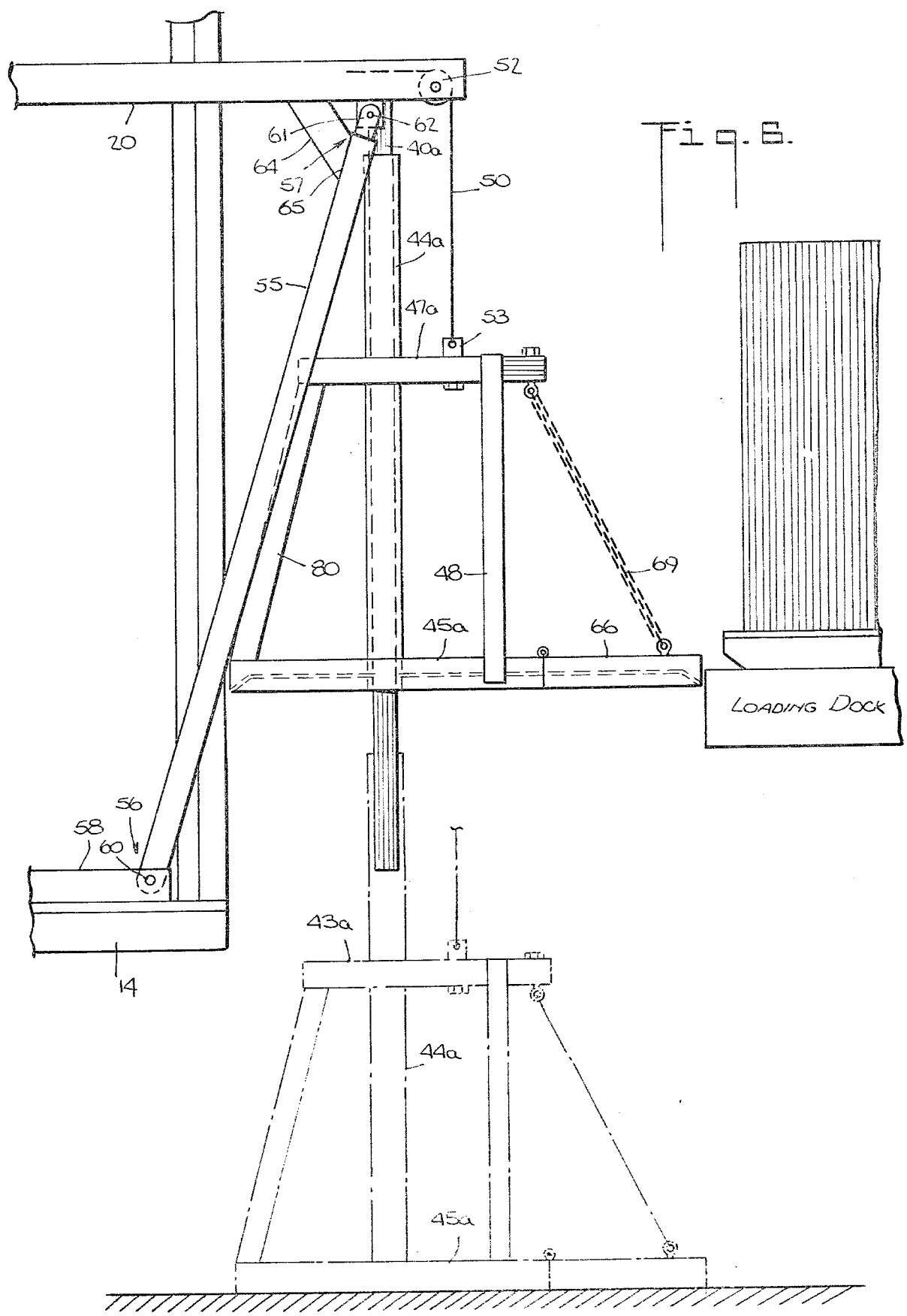
FIG. 6 is a side view in detail showing the raising and lowering of the platform above and below a vehicle floor.

FIG. 6 illustrates a modification of the lift platform of the invention particularly intended for use with vehicles which are loaded from loading docks higher than the vehicle floor, or unloaded at such stations. In this embodiment, which is otherwise similar to the embodiment shown in FIGS. 1-5, the vertical post extensions 44a have open lower ends so that they can slide upwards over the inner posts 40a to a position raised above the vehicle floor 14 as shown in solid lines in FIG. 6. In this embodiment the horizontal arms 47a extend to the rear of the post extensions and an additional brace 80 is provided between each of the arms 47a and the platform side rail 45a. The folding inner platform extension is omitted in this embodiment, but the outer platform extension 66 is retained. Of course, the cable arrangement employed is such that the platform can be raised to the elevated position shown, and lowered to the ground or sidewalk level as illustrated in dashed lines, as well as raised to vehicle floor level for storage within the vehicle.

Although the various structural parts and electrical systems of the device have been illustrated and described in detail, it will be apparent to those acquainted with the art that various modifications, adaptations, and substitutions of parts and materials can be made without departing from the spirit and scope of the invention. For example, a hand crank can be provided for manual operation of the winch 31 if desired. Additional pulleys can be employed for greater mechanical advantage if especially heavy loads are to be moved. The device could be installed in an open top vehicle or a boat or even a stationary platform although it is primarily intended for vehicular use.

What is claimed is:

1. A material lift platform useful for loading and unloading a vehicle comprising a pair of telescoping generally horizontal parallel beams, a transverse yoke slidable along said beams by means of a pair of generally symmetrically arranged cables drawn by a single winch, and a platform suspended by cables extending from said yoke over pulley means at front ends of said telescoping beams.

2. The material lift platform of claim 1 wherein said winch is driven by a D.C. motor.

3. A material lift platform useful for loading and unloading a vehicle comprising a pair of telescoping generally parallel beams, a transverse yoke slidable along said beams by means of a pair of generally symmetrically arranged cables drawn by a single winch, a platform plate suspended by cables extending from said yoke over pulley means at front ends of said telescoping beams, and a brace beam pivotally mounted near the front end of each telescoping beam for supporting said telescoping beams.

4. A material lift platform useful for loading and unloading a vehicle comprising a pair of telescoping generally parallel beams, a transverse yoke slidable along said beams by means of a pair of generally symmetrically arranged cables drawn by a single winch, and a platform plate connected to each of said telescoping beams by a telescoping post and suspended by cables extending from said yoke over pulley means at front ends of said telescoping beams.

5. The material lift platform of claim 1 wherein said platform plate has a plate extension hingedly attached thereto.

6. In a vehicle, a material lift platform movable from a retracted condition within the vehicle to an extended position in which a platform is outside the vehicle for loading and unloading the vehicle by raising and lowering the platform plate, comprising a pair of generally parallel telescoping beams pivotally secured at a rear end to a vehicle wall, a yoke slidable along said telescoping beams and a platform plate connected to said slidable yoke by cable means whereby sliding movement of said yoke causes vertical movement of said platform plate, and support means extending between front end portions of said telescoping beams and a floor of the vehicle.

7. The arrangement of claim 6 wherein said support means comprise brace beams pivotally secured to said vehicle floor and to said telescoping beams.

8. The arrangement of claim 6 wherein said slidable yoke is activated by an electric winch through a cable mechanical advantage means.

9. The arrangement of claim 8 wherein the cable mechanical advantage means comprises two symmetrically arranged cables running from opposite sides of a single drum of said winch, over pulleys to opposite end portions of said yoke.

10. The arrangement of claim 6 wherein said telescoping beams include a first section pivotally secured to the vehicle wall and a second section slidably extensible on said first section, said second sections being interconnected by a cross beam which supports a winch connected to said slidable yoke by cable means for sliding said yoke along guide means carried by said second beam sections.

11. A material lift platform device comprising a pair of parallel beams adapted to be pivotally secured to vehicle frame structure, each said beam having a telescoping extension, rear ends of said extensions being interconnected by a cross beam carrying a winch mounted centrally between said extensions and connected by a pair of cables to a sliding yoke mounted for movement along said extensions, said sliding yoke being connected by further cables to a platform plate.

12. The material lift platform of claim 11 wherein forward ends of the beam extensions are supported and braced by generally upright beams pivotally mounted for movement between a rearward slanting condition when said extensions are retracted to a forward slanting condition when said extensions are fully extended.

13. The material lift platform of claim 11 wherein said platform plate comprises a flat central portion with folding inner and outer plate extensions.

14. The material lift platform of claim 11 wherein said pair of cables are symmetrically disposed with respect to each other for coordinated motion, and said winch is driven by an electrical motor, an electrical control system for said motor including slack cable switch means for stopping the motor when the platform plate meets an obstruction.

15. The material lift platform of claim 11 including mechanical stop means limiting the forward motion of said telescoping extensions.

* * * * *